United States Patent
Pugel

[11] Patent Number: 6,118,497
[45] Date of Patent: Sep. 12, 2000

[54] INTERACTIVE SELECTION SYSTEM FOR A VIDEO DECODER MODULATOR CHANNEL

[75] Inventor: Michael Anthony Pugel, Noblesville, Ind.

[73] Assignee: Thomson Consumer Electronics, Inc., Indianapolis, Ind.

[21] Appl. No.: 09/038,732

[22] Filed: Mar. 11, 1998

[51] Int. Cl.[7] ..................................................... H04N 5/40
[52] U.S. Cl. ........................... 348/723; 348/10; 455/3.2; 386/46
[58] Field of Search ........................... 332/170; 455/108, 455/109, 120, 123, 3.2; 386/46, 108; 348/10, 11, 723, 724, 731, 732, 705, 706; 358/186, 191.1, 181; H04N 5/38, 5/40, 5/93

[56] References Cited

U.S. PATENT DOCUMENTS

| | | | |
|---|---|---|---|
| 4,213,152 | 7/1980 | Kakinuma | 348/724 |
| 4,336,555 | 6/1982 | Wine | 358/127 |
| 4,821,122 | 4/1989 | Teskey | 358/181 |
| 5,467,141 | 11/1995 | Ligertwood | 348/555 |
| 5,495,282 | 2/1996 | Mostafa et al. | 348/5 |
| 5,541,671 | 7/1996 | Pugel | 348/724 |
| 5,594,938 | 1/1997 | Engel | 348/11 |

FOREIGN PATENT DOCUMENTS

| | | | |
|---|---|---|---|
| 452 976 A2 | 10/1991 | European Pat. Off. | H04N 5/76 |
| 2934227 | 2/1980 | Germany | 386/46 |
| 58-31675 | 2/1983 | Japan | 386/46 |
| 62-231572 | 10/1987 | Japan | H04N 5/44 |
| 96/21990 | 7/1996 | WIPO . | |

*Primary Examiner*—David E. Harvey
*Attorney, Agent, or Firm*—Joseph S. Tripoli; Ronald H. Kurdyla; Alexander J. Burke

[57] ABSTRACT

A method for compatibly tuning a video signal receiver to an image processing device involves generating a prompting message for display to prompt a user to initiate a command response. First and second signals are generated. Each signal incorporates the prompting message but only one of the signals is compatibly tuned to the display. The first and second signals are alternately provided to the display and the prompting message is legibly displayed when the compatibly tuned signal is provided. The signal that is compatibly tuned to the display is selected in response to the command.

17 Claims, 2 Drawing Sheets

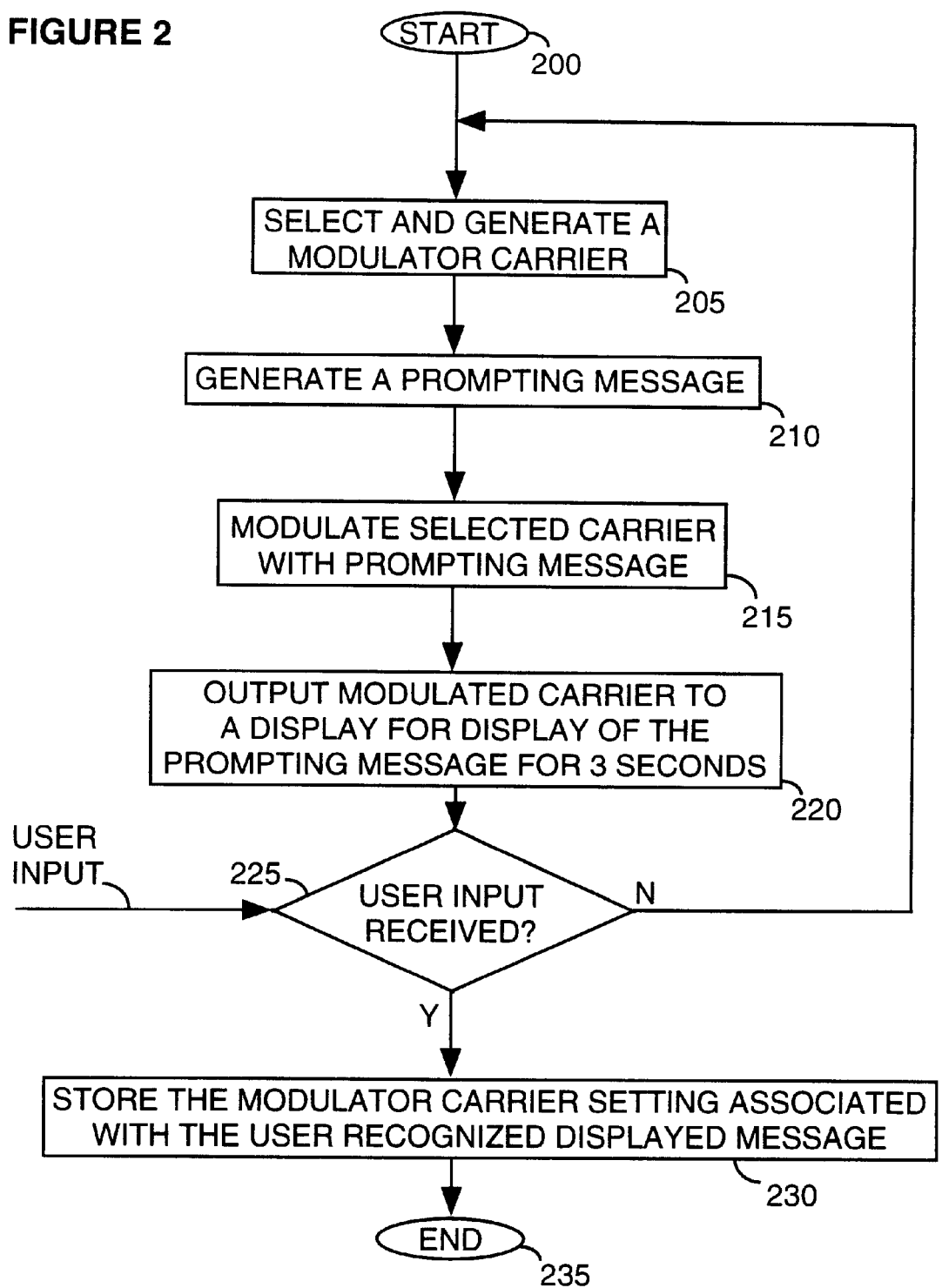

INTERACTIVE SELECTION SYSTEM FOR A VIDEO DECODER MODULATOR CHANNEL

FIELD OF THE INVENTION

This invention is related to the field of video signal processing and in particular, to modulator channel selection in a video decoder such as a satellite, television, VCR, set-top box or other receiver system, for example.

BACKGROUND OF THE INVENTION

Video signal receivers such as direct broadcast satellite receivers and video cassette recorders (VCRs) provide video output signals as Radio Frequency (RF) modulated signals to a television receiver, for example. The carrier frequency selected for this RF modulation in the United States, for example, is usually the broadcast channel 3 or channel 4 television carrier frequency. Selection of one of these channels is typically accomplished by means of a user operated manual switch. This switch is usually located on the VCR or satellite receiver unit. The user of a satellite receiver, for example, is typically directed by an instruction manual to select the broadcast channel (3 or 4) that is not used in the user's local broadcast area. The user then selects that same channel on the television receiver to ensure that the television receiver is tuned to the same carrier frequency as the satellite receiver RF output.

A problem that may arise is incompatibility between a video receiver (e.g. satellite receiver or VCR) modulator output channel and the channel to which a television receiver, receiving the modulator output, is tuned. Such an incompatibility may occur if the user is unaware of the modulator channel setting of the video receiver, and sets the television receiver to a different channel. Then, the television receiver tuner will not be set to the same carrier frequency as the video receiver RF output signal. This situation may occur upon initial video receiver system set-up up. However, such an incompatibility can also occur if the user forgets which modulator channel he has selected, if he inadvertently changes the modulator channel, or the modulator channel is changed without his knowledge.

SUMMARY OF THE INVENTION

In a system in accordance with the principles of the present invention, communication compatibility is determined by the response of a user to a prompting message recognized by the user. The prompting message is communicated in compatible and non-compatible communication modes. The user recognizes the prompting message in a compatible communication mode whereby the user does not need to know the required modulator channel setting.

BRIEF DESCRIPTION OF THE DRAWINGS

In the drawing:

FIG. 2 shows a process for selecting a video receiver modulator channel that is compatible with a display device, according to the invention.

DETAILED DESCRIPTION OF THE DRAWINGS

Figure 1:
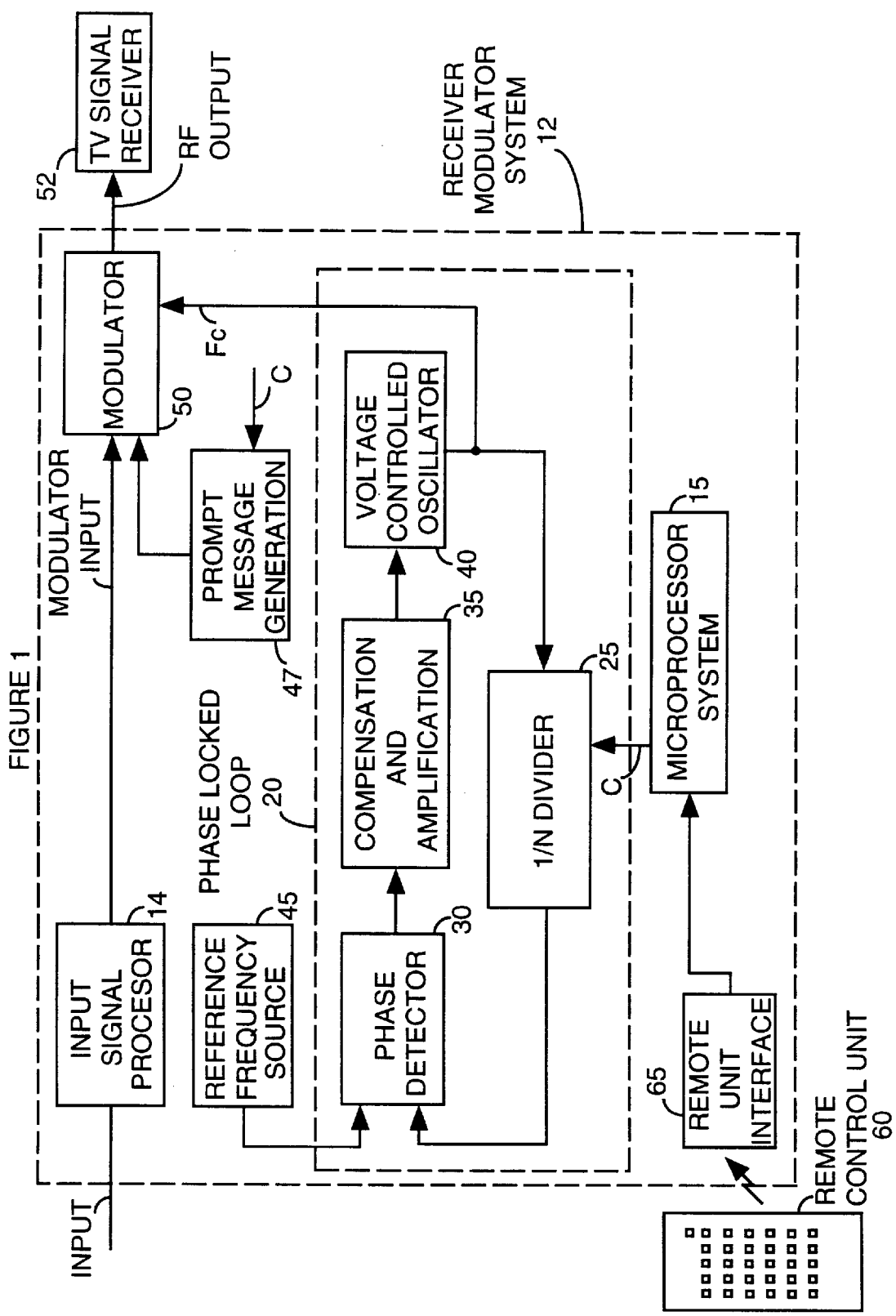
FIG. 1 shows an RF modulator for a video decoder incorporating a user interactive modulator channel selection system, according to the invention.

The inventor has recognized that it is advantageous to minimize the knowledge and tasks required of a user in setting up and re-configuring video receiver equipment. Specifically, that it is desirable that a video receiver system (such as a satellite, terrestrial, or cable receiver or VCR), attached to a video accessory (such as a TV receiver), be capable of ensuring modulator channel compatibility with a minimum of user interference. Further that such compatibility is achievable without a user needing to know the required modulator channel setting.

A satellite video signal receiver modulator stage 12, incorporating the principles of the invention, is shown in the block diagram of FIG. 1. A user selects a modulator channel in system 12 to be compatible with TV receiver 52 without the need to know the required modulator channel setting. A received video signal containing video program information, after processing by an input processor 14, is modulated onto a carrier frequency Fc by modulator 50. Modulator 50 receives carrier frequency Fc from a Phase-locked Loop (PLL) network 20 and provides an RF modulated output signal to a television receiver 52. The PLL output carrier frequency Fc is determined by a microprocessor 15 and by a reference frequency provided by a source 45. Microprocessor 15 selects the channel that is used as the modulator channel by controlling the carrier frequency Fc that is output by PLL 20. Microprocessor 15 configures and controls elements of PLL 20 and unit 47 using bi-directional control and data bus C. Selection of the modulator channel is performed upon initial set-up of a video receiver and does not normally need to be repeated unless there is a change in configuration of the video receiver system or TV receiver 52 e.g. replacement of TV receiver 52 etc. However, the modulator channel selection may also be performed upon other conditions including, for example, upon a) power-on initialization, b) recovery from a fault condition including a power interruption and a software error, and c) a user initiated command.

PLL 20 is a conventional programmable phase locked loop composed of a phase/frequency detector 30, a compensation and amplification network 35, a voltage controlled oscillator (VCO) 40 and a programmable frequency divider 25. A logic control value is written by microprocessor 15 using control bus C into a register in programmable divider 25 to determine the PLL output carrier frequency Fc provided by VCO 40 to modulator 50. The PLL output frequency is divided by programmable divider 25 and compared by detector 30 to a frequency reference from source 45. The division performed by divider 25 is determined by the logic control value written to a register within divider 25 by microprocessor 15. An output voltage of detector 30, representing the phase/frequency error, is amplified and processed by unit 35 to provide an oscillation frequency control signal to VCO 40. The amplification and processing provided by unit 35 ensures the stability of the PLL. The processing provides compensation in the form of filtering, for example, as known.

The resultant VCO 40 output frequency determined by microprocessor 15 is the carrier frequency used by modulator 50. Modulator 50 frequency modulates this carrier frequency with either a prompting message produced by generator 47 under direction of microprocessor 15 or the input signal containing video program information from source 14. The modulated output signal from unit 50 is provided to TV receiver 52 for display of either the prompting message or video program information. In another embodiment modulator 50 may also provide a composite video output signal combining a prompting message and video program information in a single image. The modulated output signal from unit 50 may also be provided to other units as required.

The purpose of the prompting message is to prompt a user to initiate a command response such as pressing a button on remote control 60, for example. Microprocessor 15 examines such a command response to determine whether it was made within an expected response time window. If the response was made within an expected window it is treated by microprocessor 15 as an indication that the prompting message is legible and recognizable to the user and therefore that the modulator channel being used by system 12 is compatible with TV receiver 52.

Microprocessor 15 employs the process of FIG. 2 for selecting a modulator channel for the video receiver modulator system 12 (FIG. 1) that is compatible with TV receiver 52. The system 12 modulator channel is selected to be compatible with TV receiver 52 without the user knowing the required modulator channel setting. This advantageously simplifies the modulator channel selection process and reduces user involvement in the process. Another advantage of the system is that it does not require use of an additional display device (separate from the video program display device e.g. unit 52) for indicating a modulator channel setting to a user.

In step 205, following the start at step 200, PLL 20 under direction of microprocessor 15 selects an initial modulator channel carrier such as cable television channel 3, for example, and outputs the corresponding channel 3 carrier frequency Fc to modulator 50. In step 210, generator 47, under direction of microprocessor 15, generates a prompting message for output to modulator 50. In step 215, the prompting message is modulated with the carrier Fc selected in step 205 and the modulated output signal is provided to TV receiver 52 for display to a user. Receiver 52 is advantageously used to display either the prompting message or the video program content thereby eliminating the need for a separate display device. However, in another embodiment a separate display device may be used for display of the prompting message.

The prompting message may take the form of any message such that, when it is displayed on unit 52, it prompts a user to initiate a command response such as pressing a button on remote control unit 60. The message may say "Press Select Button on the Remote", for example, and does not need to show a required modulator channel setting. Alternatively, the prompting message may comprise an image element identified as a user prompt in a video receiver operation manual or may comprise other text, an icon, a graphic element, or a flashing image, for example. Further, instead of commanding a user to press a button on remote unit 60, the message may direct a user to press a keyboard button, or a switch on the video receiver, or a switch on accessory equipment communicating with the video receiver. Alternatively, a user may be directed to select an icon on a displayed menu using a cursor type control, for example. It is sufficient that the prompting message and associated user response mechanism provide microprocessor 15 with a feedback response indicating the user has been able to read the prompting message displayed on unit 52.

In step 220, the prompting message is provided by modulator 50 to TV receiver 52 for display for three seconds duration under control of microprocessor 15. In step 225, microprocessor 15 determines whether a response has been received from a user e.g. whether the user pressed the "Select" button on remote unit 60 within the three seconds time period. The three seconds duration is arbitrary and may be longer or shorter depending on custom user or system requirements. If a user command response was received within the three second period, it indicates that the selected modulator channel (channel 3 in this example) is compatible with TV receiver 52 since a user was able to read the prompting message displayed on unit 52. In this case, microprocessor 15 in step 230, stores the modulator channel setting (channel 3 in this example) in non-volatile memory as the modulator channel to be used from then on.

The modulator channel selection process of FIG. 2 is normally employed at initial set-up of the combined video receiver and TV 52 system. The process of FIG. 2 does not need to be repeated except for conditions as previously discussed such as for system reconfiguration, system recovery or upon a user command. The process of FIG. 2 terminates at step 235.

If a user response was not received within the three second period in step 225, the selected modulator channel (channel 3 in this example) is deemed to be incompatible with TV receiver 52. An incompatibility between modulator channel settings of system 12 and TV receiver 52 results in an invalid, illegible or error initiated default image display on TV unit 52. Such an incompatibility prevents the prompting message from being legibly displayed on unit 52 and so prevents the consequent user command response. In this case, microprocessor 15 in step 225 directs that another modulator channel (e.g. channel 4) be selected in step 205 and that the process of steps 210–225 are repeated for the new modulator channel selection.

As previously described, a prompting message is again generated in step 210 for output to modulator 50. In step 215, the prompting message is modulated with the carrier Fc selected in step 205 and the modulated output signal is provided to TV receiver 52 in step 220 for display to a user for three seconds duration. In step 225, microprocessor 15 again determines whether a response has been received from a user e.g. whether the user pressed the "Select" button on remote unit 60 within the three seconds time period. If a command response was received within the three second period, the selected modulator channel (channel 4 in this iteration) is deemed to be compatible with TV receiver 52 and the channel 4 setting is stored in step 230 in non-volatile memory as the modulator channel to be used from then on. The process of FIG. 2 terminates at step 235.

The process of FIG. 2 may be used to select a modulator channel from more than just two channels such as channels 3 and 4 nin this example. In order to select a channel from N channels, for example, microprocessor 15 directs the repetition of steps 205–225 up to N times until a compatible channel is determined in the manner previously described. Further, steps 205–225 may be cyclically repeated to allow a user successive opportunities to respond to a prompt message. In this case, a message is presented to TV unit 52 on a first channel for three seconds then on a second channel for three seconds and then again on the first and second channels. This may be repeated as often as desired.

An error condition may occur in step 225 during the three second period when no prompting message is displayed on TV receiver 52. This is because a user may inadvertently press the "Select" button during this period, even though there is a modulator channel incompatibility between system 12 and TV receiver 52 and no prompting message is being displayed. This results in an incorrect modulator channel selection being made by microprocessor 15. Under this and other error conditions a user does not obtain a valid picture on the unit 52 display and he is directed to follow a recovery procedure by the user operation manual. For example, the user may be directed to repeat the set-up procedure of FIG. 2 by invoking specific commands using remote unit 60.

Alternatively, the user may be directed to follow a different set-up or fault diagnosis procedure that involves changing modulator channels to achieve modulator channel compatibility or to identify a system fault causing the channel incompatibility. The opportunity for a user to make an inadvertent selection in step 225 may be mitigated by requiring a more complicated response. For example, in step 225, more than one button or a specific button press sequence may be required or a menu item may have to be selected to indicate assent to the selection of the modulator channel.

A user is also directed to follow a recovery process upon the occurrence of a time-out error condition. Such an error condition may occur, for example, when no user response is received at all during the complete execution of the FIG. 2 process. Under such a time-out error condition, the user is directed by a user operation manual to follow a recovery process of the type previously described.

The configuration of elements of FIG. 1 is exemplary only and the process of FIG. 2 may be implemented in whole or in part within the programmed instructions of a microprocessor such as microprocessor 15. Further, although the invention is described in the context of an adjustable modulator channel selection system, it is also applicable in any other modulator channel selection system such as a two channel (channels 3 and 4) system as commonly used in the U.S. In addition, the principles of the invention may be employed to determine communication compatibility in a variety of systems. Specifically, the principles may be employed in any system in which communication compatibility may be determined by the response of a user to a communicated prompting message that is derivable in a compatible communication mode. For example, the invention principles may be employed in a satellite, terrestrial, or cable broadcast receiver or in a, video recorder, television, computer, set-top box, telephone or other communication device. Further, the invention is not limited to frequency, amplitude or phase modulation but applies to any form of analog or digital communication e.g. PAM, QAM, QPSK, MPEG communication etc. in which a prompting message may be compatibly conveyed to an accessory device. The expression "modulating a modulator channel carrier frequency" is intended to encompass amplitude, frequency and phase modulation and other forms of signal modulation.

What is claimed is:

1. A method for compatibly tuning a video signal receiver to an accessory including an image processing device, comprising the steps of:

generating a prompting message for display to prompt a user to initiate a command response;

generating first and second output signals, each of said output signals incorporating said prompting message and only one of said output signals being compatibly tuned to said image processing device;

alternately providing said first and said second output signals to said image processing device for legibly displaying said prompting message when one of said provided output signals is compatibly tuned to said image processing device; and selecting said compatible output signal in response to said command.

2. A method according to claim 1, wherein in said step of generating a prompting message, said prompting message excludes reference to modulator channel settings.

3. A method according to claim 1, including the step of providing video program information received by said video receiver to said image processing device, whereby said program information and said prompting message are displayed by said image signal processing device.

4. A video signal receiver method for selecting a modulator output channel carrier to be compatible with a display means, comprising the steps of:

generating first and second modulator channel carrier frequencies;

generating a prompting message for display to prompt a user to initiate a command response;

modulating said first and said second modulator channel carriers with said prompting message to provide first and second modulated signals, said first and said second modulated signals being alternately provided to said display means for legibly displaying said prompting message only when said display means is compatibly tuned to one of said first and said second modulated signals; and selecting said modulator output channel carrier in response to said user initiated command, said selected modulator output channel carrier being said one of said first and said second modulator channel carriers providing said legibly displayed prompting message.

5. A method according to claim 4, wherein in said step of generating a prompting message, said prompting message excludes reference to modulator channel settings.

6. A video signal receiver for modulating a modulator channel carrier frequency with received video program information to provide a modulated output signal compatible with a display means, said video receiver including apparatus for selecting a modulator output channel carrier comprising:

means for generating first and second modulator channel carrier frequencies;

means for generating a prompting message for display to prompt a user to initiate a command response;

means for modulating said first and said second modulator channel carriers with said prompting message to provide first and second modulated signals, said first and said second modulated signals being alternately provided to said display means for legibly displaying said prompting message only when said display means is compatibly tuned to one of said first and said second modulated signals; and means for selecting said modulator output channel carrier in response to said user initiated command, said selected modulator output channel carrier being said one of said first and said second modulator channel carriers providing said legibly displayed prompting message.

7. Apparatus according to claim 6, wherein said prompting message excludes reference to modulator channel settings.

8. Apparatus according to claim 6, wherein said user initiated command, prompted by said prompting message, is independent of modulator channel setting requirements.

9. Apparatus according to claim 6, wherein said prompting message is at least one of a) a text message, b) an icon, c) a graphic element, d) a flashing image and e) an image element identified to a user in video receiver operation information as a prompt.

10. Apparatus according to claim 6, wherein
said selecting means selects said modulator output channel carrier from among more than two modulator channel carriers.

11. Apparatus according to claim 6, wherein
said first and said second modulated signals are alternately provided to said display means for display of said prompting message for a limited time period upon a video receiver condition including at least one of a) video receiver set-up, b) power-on initialization, c) recovery from a fault condition including a power interruption and a software error, and d) a user initiated command.

12. Apparatus according to claim 6, wherein
said first and said second modulated signals are alternately and cyclically provided to said display means for repetitive display of said prompting message.

13. A video signal receiver for modulating a modulator channel carrier frequency with received video program information to provide a modulated output signal compatible with a display means, said video receiver including apparatus for selecting a modulator output channel carrier comprising:

means for generating first and second modulator channel carrier frequencies;

means for generating a prompting message for display to prompt a user to initiate a command response, said prompting message excluding reference to modulator channel settings;

means for modulating said first and said second modulator channel carriers with said prompting message to provide first and second modulated signals, said first and said second modulated signals being alternately provided to said display means for legibly displaying said prompting message when said display means is compatibly tuned to one of said first and said second modulated signals; and means for selecting said modulator output channel carrier, in response to said user initiated command, said selected modulator output channel carrier being said one of said first and said second modulator channel carriers providing said legibly displayed prompting message.

14. Apparatus according to claim 13, wherein
said prompting message is at least one of a) a text message, b) an icon, c) a graphic element, d) a flashing image and e) an image element identified to a user in video receiver operation information as a prompt.

15. Apparatus according to claim 13, wherein
said selecting means selects said modulator output channel carrier from among more than two modulator channel carriers.

16. Apparatus according to claim 13, wherein
said first and said second modulated signals are alternately provided to said display means for display of said prompting message for a limited time period upon a video receiver condition including at least one of a) video receiver set-up, b) power-on initialization, c) recovery from a fault condition including a power interruption and a software error, and d) a user initiated command.

17. Apparatus according to claim 13, wherein
said first and said second modulated signals are alternately and cyclically provided to said display means for repetitive display of said prompting message.

* * * * *